US007233832B2

(12) United States Patent
Friedman et al.

(10) Patent No.: US 7,233,832 B2
(45) Date of Patent: Jun. 19, 2007

(54) METHOD AND APPARATUS FOR EXPANDING AUDIO DATA

(75) Inventors: Sol Friedman, Sunnyvale, CA (US); Chris Moulios, Cupertino, CA (US)

(73) Assignee: Apple Inc., Cupertino, CA (US)

(*) Notice: Subject to any disclaimer, the term of this patent is extended or adjusted under 35 U.S.C. 154(b) by 745 days.

(21) Appl. No.: 10/407,852

(22) Filed: Apr. 4, 2003

(65) Prior Publication Data

US 2004/0196989 A1 Oct. 7, 2004

(51) Int. Cl.

| | |
|---|---|
| ***G06F 17/00*** | (2006.01) |
| ***G10L 11/00*** | (2006.01) |
| ***G10H 1/08*** | (2006.01) |
| ***H04B 1/20*** | (2006.01) |
| ***H04B 1/00*** | (2006.01) |

(52) U.S. Cl. .......................... 700/94; 704/278; 84/625; 84/660; 369/3; 381/119

(58) Field of Classification Search .................. 700/94; 84/612, 652, 636, 625, 660; 704/278; 369/3; 381/119

See application file for complete search history.

(56) References Cited

U.S. PATENT DOCUMENTS

| | | | | |
|---|---|---|---|---|
| 5,386,493 | A * | 1/1995 | Degen et al. | 704/267 |
| 5,842,172 | A * | 11/1998 | Wilson | 704/503 |
| 6,169,240 | B1 * | 1/2001 | Suzuki | 84/605 |
| 6,232,540 | B1 * | 5/2001 | Kondo | 84/612 |
| 6,534,700 | B2 * | 3/2003 | Cliff | 84/603 |
| 6,801,898 | B1 | 10/2004 | Koezuka | 704/500 |
| 6,889,193 | B2 * | 5/2005 | McLean | 704/500 |
| 2001/0017832 | A1 * | 8/2001 | Inoue et al. | 369/53.34 |
| 2001/0039872 | A1 * | 11/2001 | Cliff | 84/609 |
| 2003/0050781 | A1 * | 3/2003 | Tamura et al. | 704/267 |
| 2004/0122662 | A1 * | 6/2004 | Crockett | 704/200.1 |
| 2004/0254660 | A1 * | 12/2004 | Seefeldt | 700/94 |

OTHER PUBLICATIONS

Moller-Nielsen, P. Time-Stetching with a Time-Dependent Stretch Factor. Aarhus University. Oct. 22, 2002.*

Moller-Mielse, P. Time-Strecthing with a Time-Dependent Stretch Factor. Aarhus University. Oct. 22, 2002.*

* cited by examiner

*Primary Examiner*—Vivian Chin
*Assistant Examiner*—Devona E. Faulk
(74) *Attorney, Agent, or Firm*—Hickman Palermo Truong & Becker LLP

(57) ABSTRACT

Systems implementing the invention allow a user to time stretch an audio track without changing the pitch of the sound, and to produce optimal audible qualities of the output signal. The approach utilized in the invention relies on providing several time stretching methods, each one of which is selected based on one or more criteria of the audio data properties. One method relies on crossfading pairs of segments of audio data while running one segment backward every other repetition. The second time stretching method detects inaudible segments and inserts longer periods of audible data within those segments. The third method utilizes a reverb to create a reverb segment that is played after the original segment.

12 Claims, 11 Drawing Sheets

METHOD AND APPARATUS FOR EXPANDING AUDIO DATA

FIELD OF THE INVENTION

The invention relates to the field of audio data engineering. More particularly, the invention discloses a method and apparatus for expanding audio data.

BACKGROUND

Artisans with skill in the area of audio data processing utilize a number of existing techniques to modify audio data. Such techniques are used, for example, to introduce sound effects (e.g., adding echoes to a sound track), correct distortions due to faulty recording instruments (e.g., digitally master audio data recorded on old analog recording media), or enhance an audio track by removing noise.

One method to enhance an audio file involves lengthening the audio data. The process of lengthening or time stretching audio data allows users to expand data into places where it would otherwise fall short. For example, if a movie scene requires that an audio track be of a certain duration to fit a timing requirement and the audio track is initially too short, the audio data would need to be lengthened in a way that does not radically distort the sound of that data. Time stretching also provides a way to conceal errors in an audio signal, such as replacing missing or corrupted data with an extension of the audio signal that precedes the gap (or follows the gap).

One way to slow down or speed up playback of an audio track or to take up a longer or shorter duration of time involves changing the speed of playback. However, because sound carries information in the frequency domain, slowing down a waveform results in changing the wavelength of the sound. The human ear perceives such wavelength changes as a change in the pitch. To a listener, that change in the pitch is generally unacceptable.

Existing solutions for lengthening audio data, without modifying the pitch, take segments from within the audio data and insert copies of those segments repeatedly to create a new lengthier audio data.

There are at least two drawbacks to this prior art lengthening approach: 1) the human ear is very sensitive to such audio manipulations as the outcome is perceived as having audible artifacts; and 2) the insertion of segments in the audio data frequently results in producing discontinuities that generate high frequency wave forms which are not adequately filtered by the low-pass filter that is in one way or another present in playback devices. The human ear perceives high-frequency artifacts as clicks. Furthermore, existing techniques require additional manipulations to mask the artifacts introduced by the insertion/repetition techniques. Some of these masking techniques attempt to hide the artifacts by fading the end of the inserted segments. Often, however, the human ear can perceive imperfections, even when masking techniques are applied. A solution that aims at time stretching audio data while preserving the pitch should avoid introducing artifacts through numerical manipulation of the audio data (e.g. numerical filters) to minimize any imperfections perceivable by the human ear.

There is a need for a method and apparatus for modifying the length of an audio track while preserving its audible qualities. Embodiments of the invention provide a method for "time stretching" an audio signal while keeping the pitch unchanged and optimizing the audible qualities.

SUMMARY OF THE INVENTION

Figure 1A:
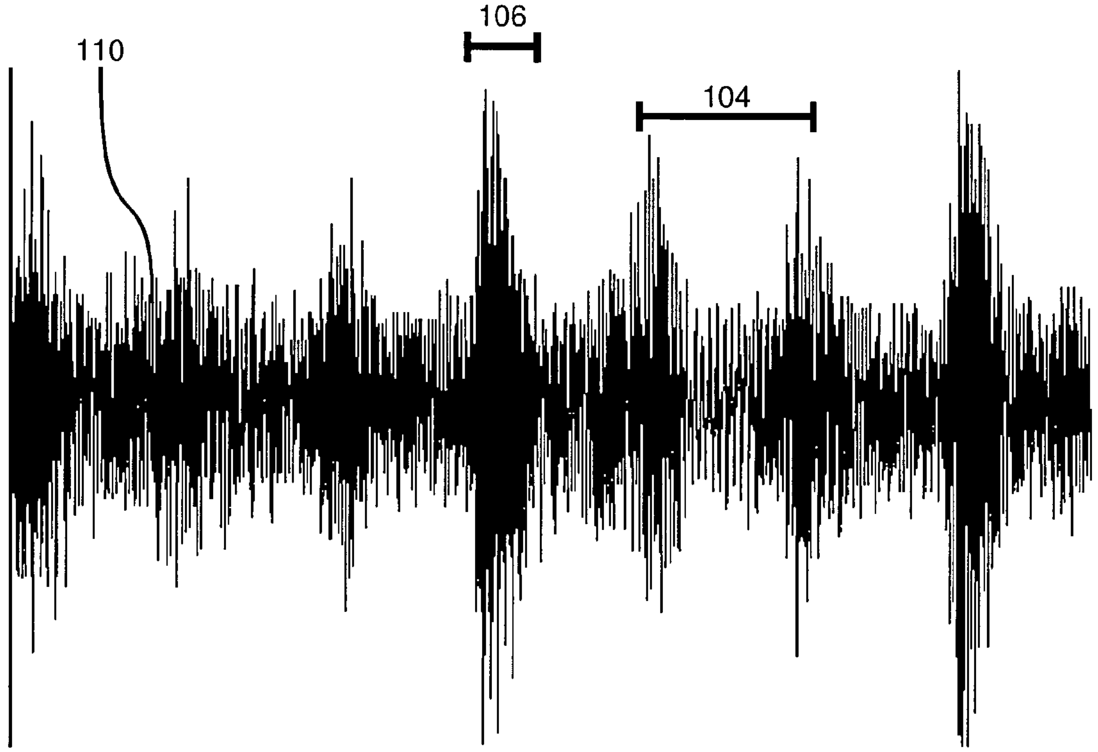
FIGS. 1A and 1B illustrate waveforms of typical audio data as used in embodiments of the invention.

An embodiment of the invention relates to a method and apparatus for time stretching audio data. Systems embodying the invention provide multiple approaches to time stretching audio data by preprocessing the data and applying one or more time stretching methods to the audio data. Preprocessing the audio data involves one or more techniques for measuring the local energy of an audio segment, determining a method for forming audio data segments, then applying one or more methods depending on the type of the local energy of the audio signal. For example, one approach measures the local square (or sum thereof) of amplitudes of a signal. The system detects the spots where the energy amplitude is low. The low local energy amplitudes may occur rhythmically, as in the case of music audio data. The low local energy amplitudes may also appear frequently, with a significant difference between high-energy amplitudes and low energy amplitudes, such as in the case of speech.

The system implements multiple methods for time stretching audio data. For example, when low energy amplitude occurrences are lasting and regular, a zigzag method is applied to the audio data. The zigzag method involves selecting a pair of low energy amplitude segments and cross-fading the segments in a sequence whereby in every other repetition a segment is run backward and cross-faded with the pairing segment run forward. The zigzag method, also, involves copying one of the segments alternately forward then backward between consecutive repetitions.

When the system detects frequent pauses, such as in a speech or percussion, the system utilizes a method that inserts inaudible data within the segments of pause. Some audio signals can be time stretched with this method very successfully, particularly signals which have portions that are energetic (loud) and, ideally, portions that are silent. Such is the case for recordings of many percussive musical instruments, such as drums; here, nearly all of the energy of a segment may be concentrated in a very short loud section (the striking of the drum). Signals with no quiet section or of constant energy do not lend themselves to this technique.

The system utilizes a reverberation based time stretch method of the invention on continuous-energy signals. The reverberation method involves utilizing a reverb means to create a reverb image of a segment, play the segment and join the reverb segment at the end of it.

DETAILED DESCRIPTION

The invention discloses a method and apparatus for providing time stretching of audio data. In the following description, numerous specific details are set forth to provide a more thorough description of embodiments of the invention. It will be apparent, however, to one skilled in the art, that it is possible to practice the invention without these specific details. In other instances, well known features have not been described in detail so as not to obscure the invention.

Terminology

Throughout the following disclosure, any reference to a user alternately refers to a person using a computer application and/or to one or more automatic processes. The automatic processes may be any computer program executing locally or remotely, that communicates with embodiments of the invention following, and that may be triggered following any predetermined event.

In the disclosure, any reference to a data stream may refer to any type of means that allows a computer to obtain data using one or more known protocols for obtaining data. In its simplest form, a data source is a location of a random access memory of a digital computer. Other forms for data streams comprise a flat file (e.g. text or binary file) residing on a file system. A data stream may also be a data stream through a network socket, a tape recorder/player, a radio-wave enabled device, a microphone or any other sensor capable of capturing audio data, an audio digitizing machine, any type of disk storage, a relational database, or any other means capable of providing data to a computer. Also, an input buffer refers to a location capable of holding data while in the process of executing the steps in embodiments of the invention. Throughout the disclosure, an input buffer, input audio data, and input data stream all refer to a data source. Similarly, an output buffer, output data, and output data stream all refer to an output of audio data, whether for storage or for playback.

Digital audio data are generally stored in digital formats on magnetic disks or tapes and laser readable media. The audio data may be stored in a number of file formats. Examples of audio file formats are the Audio Interchange File Format (AIFF). This format stores the amplitude data stream and several audio properties such as the sampling rate and/or looping information. The system may embed audio data in a file that stores video data, such as Moving Picture Expert Group (MPEG) format. The invention as disclosed herein may be enabled to handle any file format capable of storing audio data.

The invention described herein is set forth in terms of method steps and systems implementing the method steps. It will be apparent, however, to one with ordinary skill in the art that the invention may be implemented as computer software i.e. a computer program code capable of being stored in the memory of a digital computer and executed on a microprocessor, or as a hardware i.e. circuit board based implementation (e.g. Field Programmable Gate-Array, FPGA, based electronic components).

Audio Data and Waveforms

Figure 1B:
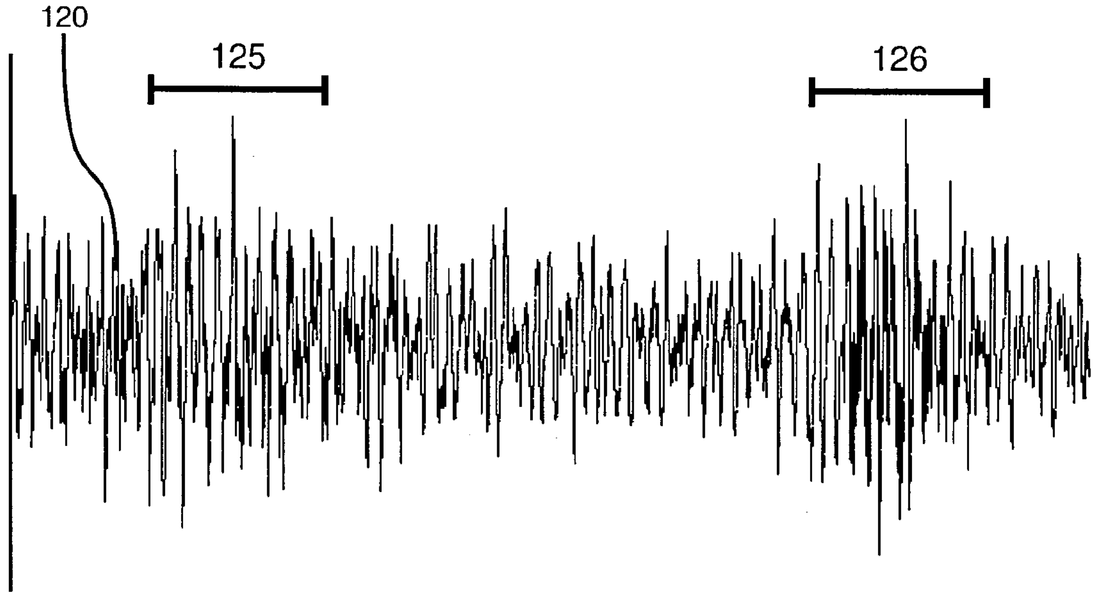

FIGS. 1A and 1B illustrate waveforms of typical audio data as used in embodiments of the invention. Audio data 110, as illustrated in FIG. 1A, is a ten (10) second piece of a music recording. The waveform of music recordings (e.g. 110) is generally characterized by transients (e.g. 106) representative of one or more instruments that keep a rhythmic beat at regular intervals (e.g. 104). Waveform 120 in FIG. 1B shows a magnified view of a small portion from plot 110 of FIG. 1A. Regions 125 and 126 correspond to two (2) successive beats. The beats (or transients) are generally characterized by a noticeably high amplitude (or energy), and a more complex frequency composition. Between beats, the waveform shows a steadier activity.

Waveforms of voice recordings also possess some descriptive characteristics that are distinct from the music. For example, the waveform of voice data shows more pauses, and an absence of rhythmic activity. In the following disclosure, the invention describes ways to analyze the waveforms having transients caused by rhythmic beats in audio data. However, it will be apparent to one with ordinary skill in the art, that the system may utilize similar techniques for analyzing voice data, or any other sources of audio data, to implement the invention.

Figure 2:
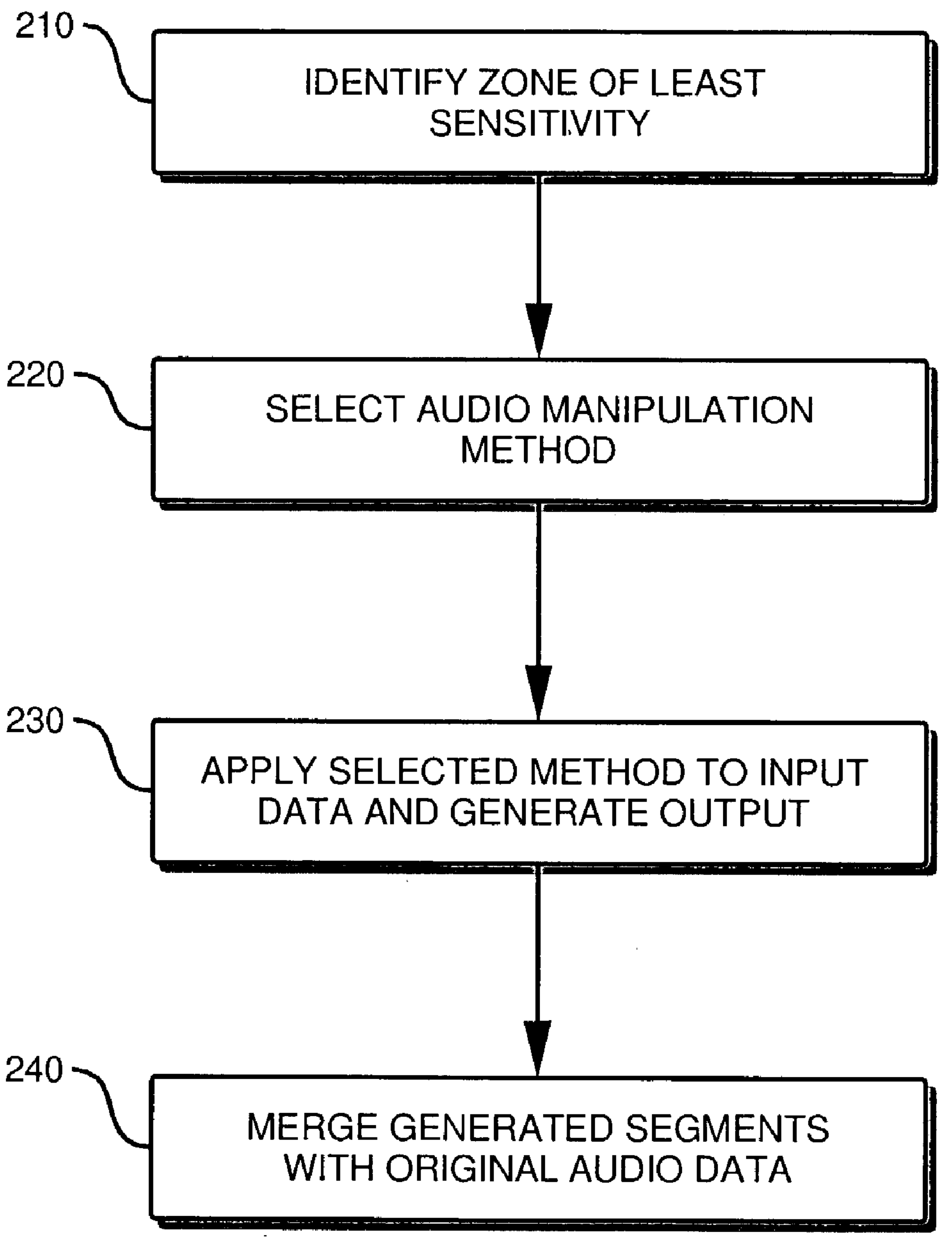
FIG. 2 is a flowchart that illustrates the steps involved in providing audio data expansion.

FIG. 2 is a flowchart diagram that illustrates the overall steps involved in providing audio data expansion in embodiments of the invention. At step 210, a system embodying the invention analyzes the audio data to be expanded to detect one or more zones of least sensitivity to the method. Sensitivity defines the amount of artifacts the method is likely to introduce in the output signal. The system uses one or more criteria to detect zones ready for manipulation while introducing the least amount of artifacts in the output data. For example, the system is able to detect local energy values in signal amplitude and frequency domains, and determine the zones (or segments) of audio data within which one or more expansion methods may be applied without introducing audible artifacts. At step 220, the system selects one or more methods to achieve the results based on the audio characteristics determined at step 210. Three different methods (Threshold, Crossfading, and Threshold Insertion) for expanding an audio data segment, as well as the favorable conditions in which each of the methods yields optimum results are discussed below.

At step 230, the system applies the selected method to the input audio data and generates an output audio data. Generally, the expansion method (or methods) utilizes one or more original buffers as input data and one or more output buffers. The system may use other buffers to store data for intermediary steps of data processing. At step 240, the system writes (or appends) the processed data in an output buffer.

Figure 3:
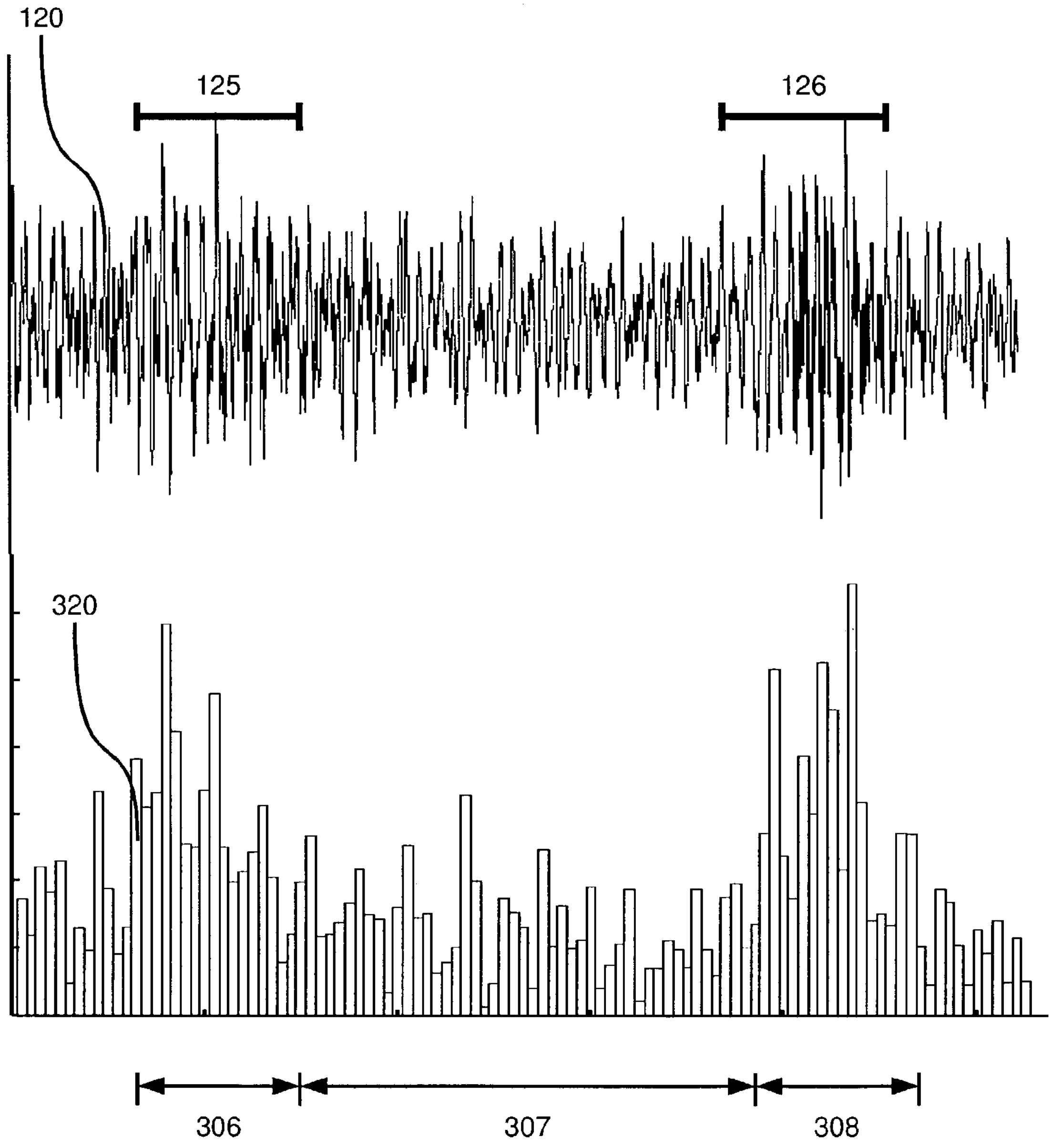
FIG. 3 shows plots of an audio data segment waveform and its local energy.

FIG. 3 shows plots of an audio data segment waveform and its local energy, typically used in embodiments of the invention. Plot 120 shows a segment of audio data as explained in FIG. 1. Plot 320 shows the energy corresponding to the audio data represented in 120. In this example, the system computes the energy using the square of each data point's amplitude. Plot 320 represents local energy by binning samples (e.g. by summing each five consecutive data points). The system can also utilize other methods for computing local energy. For example, instead of the square function, the system may compute the energy using the absolute value of data points, or any other method capable of representing the energy of a signal.

In one embodiment of the invention, the energy of an audio segment provides a mechanism for detecting zones that lend themselves to audio data manipulation while minimizing audible (or unpleasant) artifacts. For example, in FIG. 3 a simple threshold technique may enable the system to detect zones of activity such as 306, 307 and 308. Whereas zones 306 and 308 are zones of high (and more complex) activity, zone 307 presents a steadier activity. In embodiments of the invention, zone 307 provides segments where the system may optimally utilize expansion methods. For example, by repeatedly replicating smaller segments within zone 307, it is possible to expand an audio segment, up to a certain expansion ratio, without introducing unpleasant audible artifacts.

One feature of the invention is the ability to slice the audio data in a manner that allows a system to identify the processing zones. The system may index processing zones (or slices) using the segment's amplitudes. In music audio data, the beats, typically, follow the music notes or some division thereof. The optimal zones are typically found in between beats.

Crossfading Method

Crossfading refers to the process where the system mixes two audio segments, while one is faded-in and the second one is faded-out.

Program Pseudo-Code 1

```
for(i=0; i<stretched_length; i++)
{
    fade_in = i / stretched_length;
    fade_out = 1.0 - fade_in;
    output_buffer[i] = fade_out * original_buffer[i]
        +fade_in *
        original_buffer [
            original_length
            - stretched_length + i];
}
```

Program Pseudo-code 1 illustrates the basic time stretching crossfade method. "original_buffer" is a range of memory which holds one segment of the unprocessed signal; "original_length" is the length of the original segment in samples; "Output_buffer" is a range of memory which holds the results of the crossfade calculations; "stretched_length" is the length of the resulting "output_buffer" segment in samples, which is larger than the "original_buffer" segment length; "fade_in" is a fraction that smoothly increases from 0.0 to 1.0; "fade_out" is a fraction that smoothly decreases from 1.0 to 0.0.

Program Pseudo-Code 1 uses a linear function for fade-in and fade out. However, the fading function most frequently used is the square root. An embodiment of the invention utilizes a linear function that approximates a square root function to reduce the computation time. The invention may utilize other "equal power" pairs of functions (such as sine and cosine). In addition, the index for the faded-in portion (in the last line of code) exceeds the starting boundary, i.e. references values before the beginning of the buffer; such a negative index refers to samples from a previous segment's buffer. The code above illustrates the crossfade process applied to a single segment of audio. It is assumed, however, that a segment exists before and after this segment.

Figure 4:
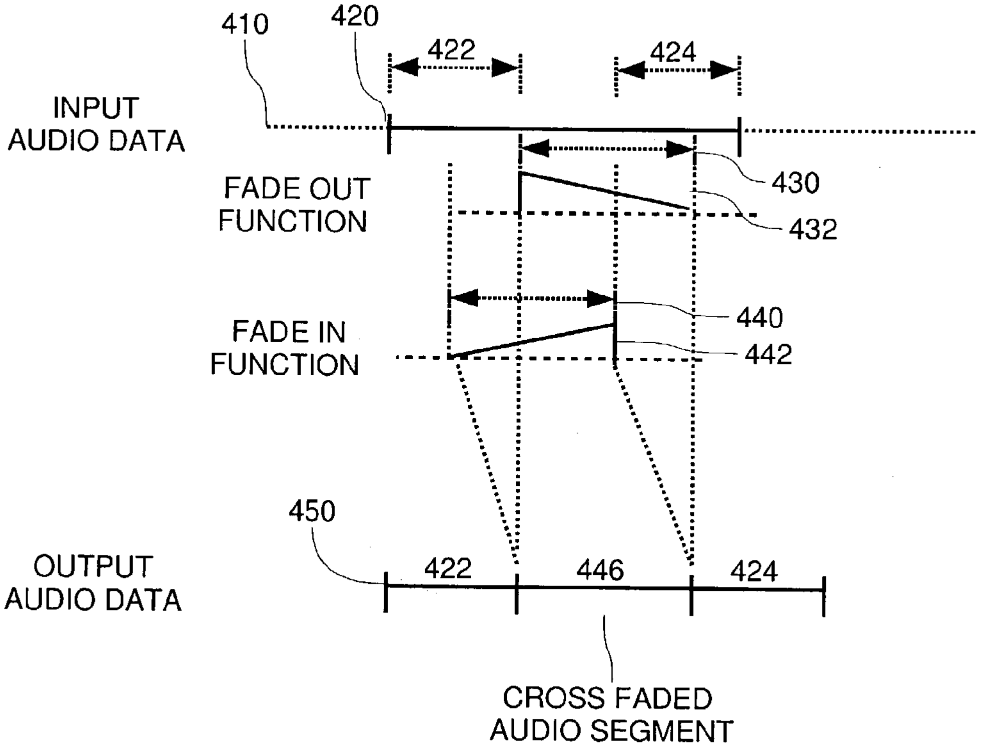
FIG. 4 is a block diagram illustrating the process by which a system embodying the invention expands audio data.

FIG. 4 is a block diagram illustrating the process by which a system embodying the invention expands audio data. FIG. 4 illustrates an improved version of the basic crossfade method utilizing a combination of crossfading and copying. Specifically, the system copies a portion of the beginning of the segment (e.g. 422, a middle portion is then cross-faded and a final portion (e.g. 424) is then copied, completing processing of the segment.

The system processes an input stream of audio data 410 in accordance with the detection methods described at step 210. The system divides the original audio signal 410 into short segments. In the example of FIG. 4, the system identifies a processing zone (e.g. starting at 420). The system may further analyze the processing zone and select one or more processing methods for expanding the audio data. After the data is processed, the system appends that data to an output buffer 450. In the example provided in FIG. 4, a first segment 422 and a second segment 424 are destined for copying without modification to the beginning and the end of the output buffer, respectively.

In FIG. 4, after the system copies segment 422 to the output buffer, the system cross-fades two segments 430 and 440. In the example of FIG. 4, Segment 422 is faded-out while segment 424 is faded in. For example, an audio signal is faded-out (attenuated from full amplitude to silence) quickly (on the order of 0.03 seconds to 0.3 seconds) while the same audio signal is faded-in from an earlier position, such that the end of the faded-in signal is delayed in time, thus making the audio signal appear to sound longer. The division into segments is such that the beginning of each super segment occurs at a regular rhythmic time interval. Each segment represents an eighth note or sixteenth note, for example. The crossfading method is detailed in U.S. Pat. No. 5,386,493, assigned to Apple Computer, Inc. and incorporated herein by reference.

Program Pseudo-Code 2

```
    crossfade_length = end_crossfade - begin_crossfade;
    for(i=0; i<stretched_length; i++)
    {
        // copy first segment
        if (i<begin_crossfade)
            output_buffer[i] = original_buffer[i];
        // crossfade within the segment
        else if((i>=begin_crossfade) && (i<end_crossfade))
            fade_in = (i - begin_crossfade) /
crossfade_length;
        fade_out = 1.0 - fade_in;
            output_buffer[i] = fade_out * original_buffer[i]
                + fade_in * original_buffer[original_length
                    - stretched_length + i];
        // copy the final segment
    else if (i>=end_crossfade)
        output_buffer[i] = original_buffer[original_length -
                stretched_length + i];
    }
```

Program Pseudo-Code 2 illustrates an improved "Copy-Crossfade-Copy" time stretch method. The segment is broken into three pieces: a copy section (e.g. 422), a middle crossfade section and a final copy section (e.g. 424). The result from crossfading segments 430 and 440 is a composite segment 446. This copy-crossfade-copy method works up to a stretch ratio of around 1.5; i.e. the new stretched audio signal can be up to 1.5 times as long as the original signal without significant artifacts being audible.

Figure 5:
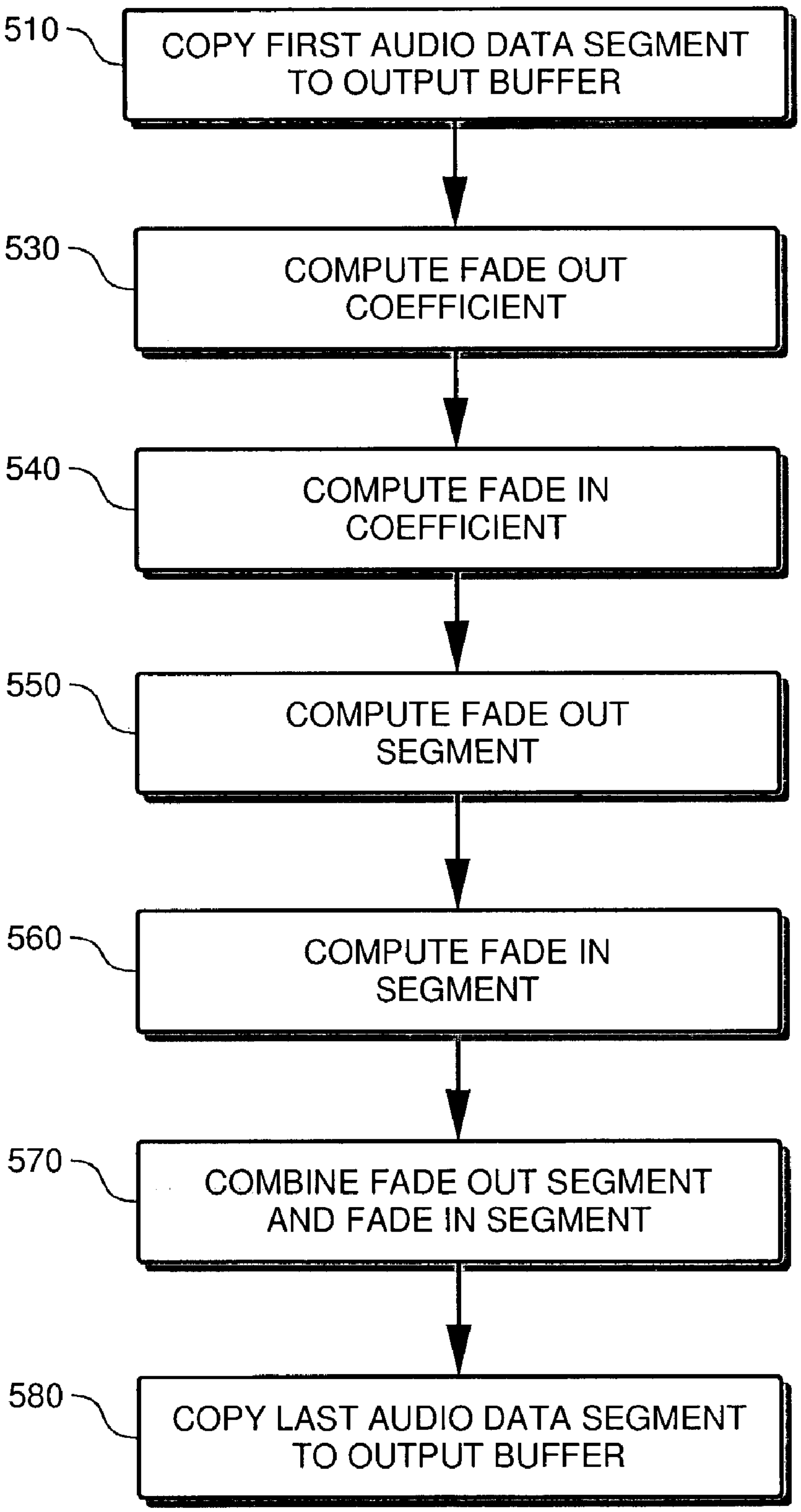
FIG. 5 is a flowchart diagram illustrating steps involved in the basic crossfading method used in embodiments of the invention.

FIG. 5 is a flowchart diagram illustrating steps involved in the basic crossfading method used in embodiments of the invention. At step 510, a system embodying the invention copies one or more unedited segments of audio data from the original buffer to an output buffer. When the system reaches a crossfading segment, it computes a fade-out coefficient, using one or more fading functions described above, at step 530. At step 540, the system computes the fade-in coefficient. At step 550, the system computes the fade-out segment. For example, step 550 computes the product of a data sample from the original buffer segment 430, of FIG. 4, and a corresponding fade-out coefficient in 432. At step 560, the system computes the fade-in segment. For example, step 560 computes the product of a data sample from the original buffer segment 440, of FIG. 4, and a corresponding fade out coefficient in 442.

At step 570, a system embodying the invention combines the fade-out segment and the fade-in segment to produce the output cross-faded segment. Combining the two segments typically involves adding the faded segments. However, the system may utilize other techniques for combining the faded segments. At step 580, the system copies the remainder of the unedited segments to the output buffer.

Figure 6:
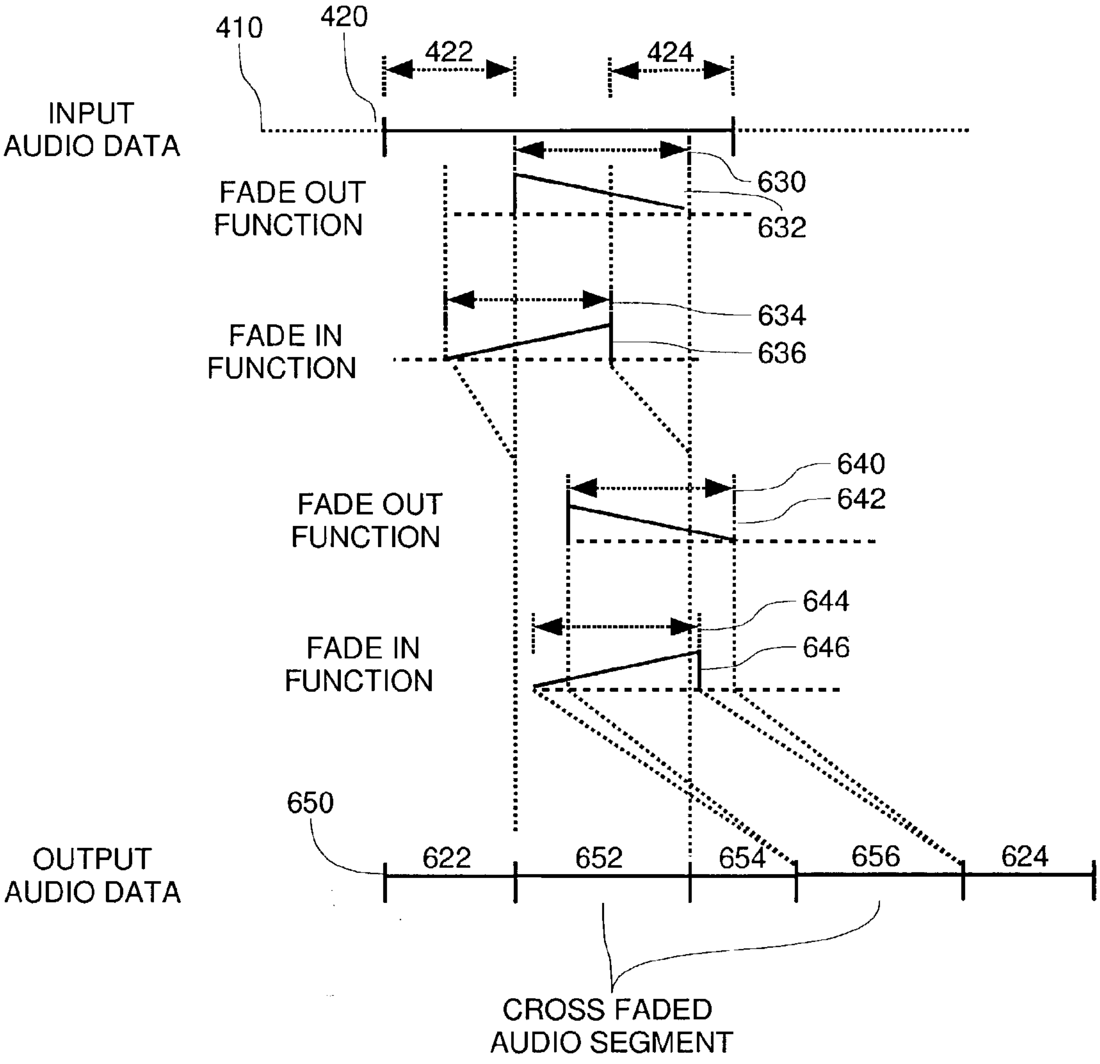
FIG. 6 is a block diagram that illustrates the process by which a system embodying the invention builds a chain of crossfaded segments to achieve larger expansion ratios.

FIG. 6 is a block diagram that illustrates the process by which a system embodying the invention builds a chain of cross-faded segments to achieve larger expansion ratios. The example, of FIG. 6 utilizes an input stream 410 such as the one described in FIG. 4. The input audio is analyzed and segments suitable (e.g. starting at 420) for applying one or more time stretching methods.

To achieve stretch ratios larger than the ones described above (i.e. one and half times), additional crossfade-copy sections can be chained together to achieve the desired length. Research, using empirical testing leading to the invention, shows that repeating a middle crossfade-copy-crossfade section of maximum possible length is advantageous; thus the invention uses "begin_max_crossfade" and "end_max_crossfade" below. These values are defined positions within the range of the original buffer length, while "begin_crossfade1", "begin_crossfade2" etc. (without the max in the middle of the name) are points in the new stretched buffer, which exceeds the length of the original buffer. Program Pseudo-code 3 (below) shows how to create a sequence of copy-crossfade-copy-crossfade-copy-crossfade-copy.

Program Pseudo-Code 3

```
    crossfade__length = end__crossfade1 – begin__crossfade1;
    for (i=0; i<stretched__length; i++)
    {
        // copy from original buffer to stretch buffer
        if (i<begin__crossfade1)
            output__buffer[i] = original__buffer[i];
        // first crossfade
        else if((i>=begin__crossfade1) && (i<end__crossfade1))
            fade__in = (i – begin__crossfade1) /
    crossfade__length;
        fade__out = 1.0 – fade__in;
            output__buffer[i] = fade__out * original__buffer[i]
            + fade__in * original__buffer[begin__max__crossfade1
            + i – begin__crossfade1];
        // second copy
        else if((i>= end__crossfade1)&&(i<begin__crossfade2))
        output__buffer[i] = original__buffer[end__max__crossfade1
            + i – end__crossfadel];
        // second crossfade
        else if((i>=begin__crossfade2) && (i<end__crossfade2))
```

-continued

Program Pseudo-Code 3

```
            fade__in = (i – begin__crossfade2)   /
    crossfade__length;
            fade__out = 1.0 – fade__in;
            output__buffer[i] = fade__out *
                original__buffer[begin__max__crossfade2 + i
                – begin__crossfade2]
                + fade__in *
    original__buffer[begin__max__crossfade1
                + i – begin__crossfade2];
        // third copy
        else if((i>=end__crossfade2)&&(i<begin__crossfade3))
            output__buffer[i] =
    original__buffer[end__max__crossfade1
                    + i – end__crossfade2];
        // third crossfade
        else if((i>=begin__crossfade3) && (i<end__crossfade3))
            fade__in = (i – begin__crossfade3)   /
    crossfade__length;
        fade__out = 1.0 – fade__in;
        output__buffer[i] = fade__out *
                original__buffer[begin__max__crossfade2 + i
                – begin__crossfade3]
                + fade__in * original__buffer[original__length –
                stretched__length + i];
        // final copy
        else if((i>=end__crossfade3)&&(i<stretched__length))
            output__buffer[i] =
    original__buffer[original__length –
                    stretched__length + i];
    }
```

In FIG. 6, the crossfading method is applied twice on an audio segment. A first application concerns segments 630, faded-out with function 632, combined with segment 634, faded-in with function 636. The result of the first crossfading is segment 652. A second crossfading concerns segments 640, faded-out with function 642, combined with segment 644, faded-in with function 646. The result of the second crossfading is segment 656. In between crossfading repetitions unedited inter-segments copies 622, 654 and 624 and directly copied from the original audio data stream to the output buffer 650.

Although the crossfading method allows arbitrarily large time stretch ratios, the rapid repetition of the same short section of audio many times in a row may produce unpleasant audible artifacts. Artifacts sound similar to a buzz or rapid flutter.

Figure 7A:
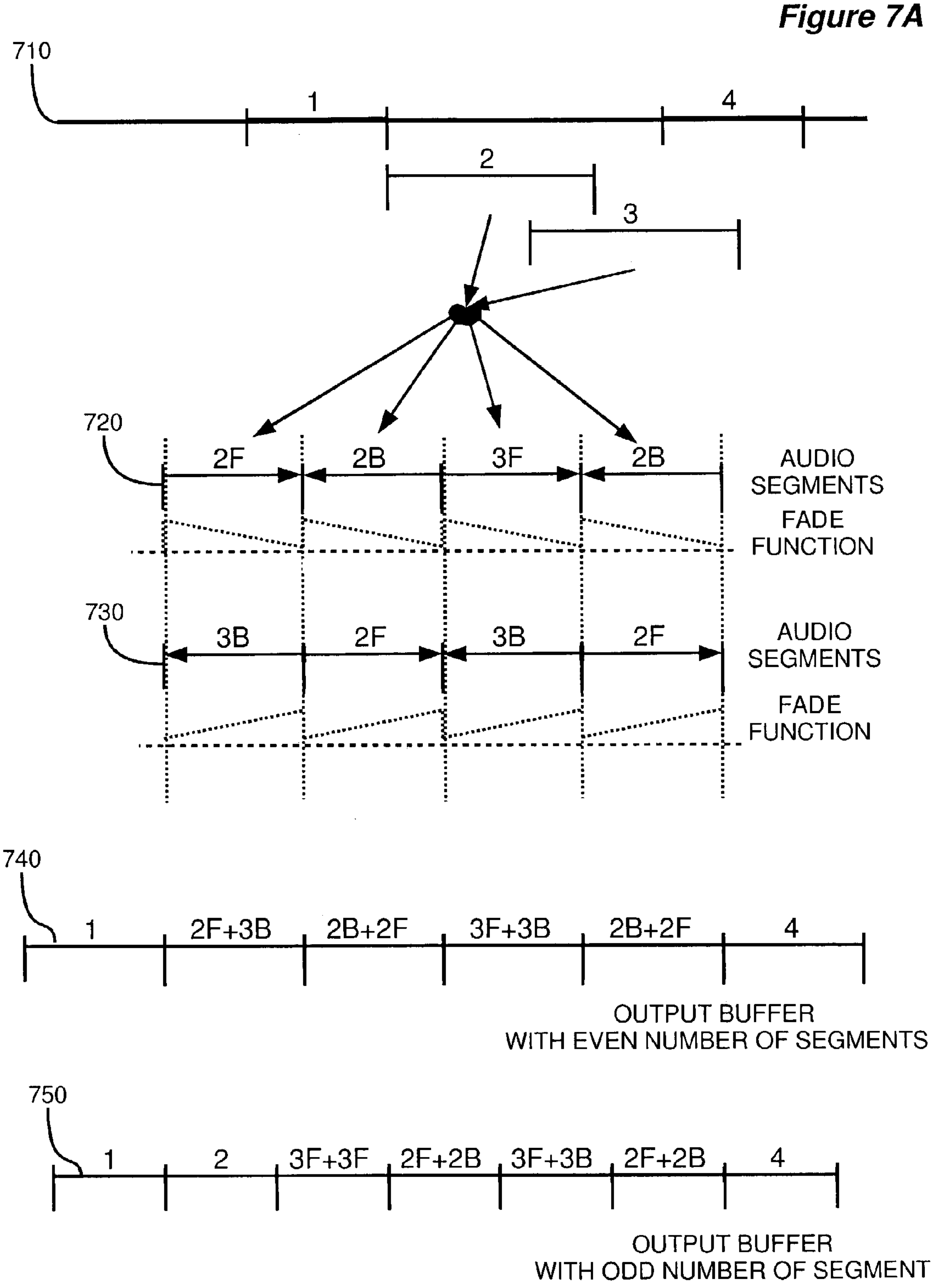
FIG. 7A illustrates the process by which a system embodying the invention builds a chain of crossfaded segments to achieve larger expansion ratios while preserving a high quality of audible audio data.

FIG. 7A illustrates the process by which a system embodying the invention builds a chain of cross-faded segments to achieve larger expansion ratios while preserving a high quality of audible audio data. The invention provides a modification to the "Chained Copy-Crossfade-Copy" method (described in FIG. 6) that reverses every other crossfade-copy-crossfade section in time. The basic concept is that every other crossfade-copy-crossfade cycle one (or both) of the cross-faded segments are run backward.

This back and forth, or "Zigzag" approach produces better sounding audio streams for large stretch ratios because the repeated section is effectively twice as large relative to the ordinary Chained Copy-Crossfade-Copy method ("back and forth" is twice as long as "forth only"). Thus, the artifact that arises from rapid repetition of the same audio signal is reduced by up to half.

FIG. 7A shows two segments 1 and 4 determined to be unedited copy segments. Segments 1 and 4 are treated as 422 and 424 (in previous figures), and are copied from the input audio stream to the output audio stream. Segments 2 and 3 are examples of segments used to create stretched segments of the output stream in accordance with embodiments of the invention. Sequence 720 shows successive fade-out segments. Rightward pointing arrows in the sequence designate those segments used in a forward sense during the computation of the fade-out segment. Leftward pointing arrows designate segments used in a backward (reverse) sense during the computation of the fade-out segment. Likewise, in sequence 730 rightward and leftward pointing arrows designate forward and backward senses, respectively, during the computation of the fade-in segment. The designations "F" and "B" are also indications for whether a segment is used in a forward or backward sense, respectively.

Output stream 740 shows the result of the computation using forward and backward alternations when the number of repetitions is an even number. Output stream 750 is an example of a combination of crossfading technique used for an odd number of repetitions.

Restricting the number of middle crossfade-copy sections to odd numbers (e.g. 1, 3, 5, 7, etc.) was found in research leading to the invention to improve the overall sound quality. This ensures a regular forward-backward-forward-backward-forward pattern; if even the number of sections were allowed, irregular patterns such as forward-backward-forward-forward would result, which sound inferior.

Figure 7B:
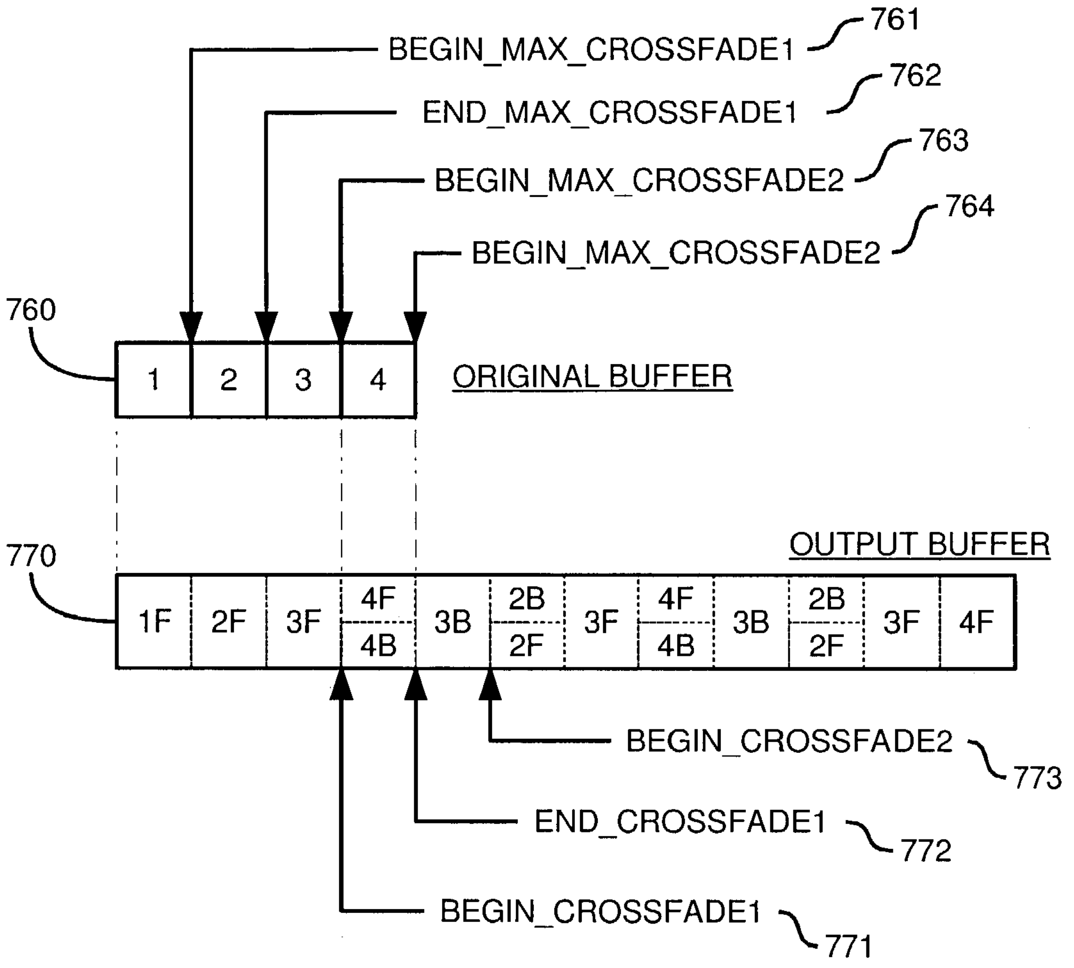
FIG. 7B illustrates a particular embodiment of the invention that allows a system to expand an original audio signal while preserving a high quality of audible audio data.

FIG. 7B illustrates a particular embodiment of the invention that allows a system to expand an original audio signal while preserving a high quality of audible audio data. In the example of FIG. 7B, the system defines four (4) sub-segments 1, 2, 3 and 4 in an original data segment 760. The system defines the sub-segments by defining the boundaries 761, 762, 763 and 764 that indicate to a system the limits for conducting one or more types of data processing. The system computes the boundaries' values in a manner that prevents, for example, indices to point out of the buffer range. In the example of FIG. 7B, 761 defines the end of a sub-segment (1) which the system copies unedited to the output buffer 770. Boundaries 761 and 762 indicate a maximum beginning and a maximum ending of a first crossfading region (labeled 2). Likewise, boundaries 763 and 764 indicate a maximum beginning and a maximum ending of a second crossfading region (labeled 4). The maximum beginning and maximum ending defines the positions within which the system selects the portions of a sub-segment to be crossfaded.

The system, in the example of FIG. 7B, generates the output buffer 770 by first copying sub-segments 1, 2 and 3 to the output buffer. The system then generates a first crossfaded portion using sub-segment 4 forward crossfaded with segment 4 backward. The boundaries 771 and 772 define the beginning and end of the first crossfaded portion. The system then reverses sub-segment 3 and copies the reversed segment to the output buffer. Then, the system generates a second crossfaded portion using sub-segment 2. The system uses sub-segment 2 forward crossfaded with itself backward. The boundary 773 defines the beginning of the second crossfaded portion. The system copies segment 3 to the output buffer, then repeats the crossfading-copying process (i.e. generate first crossfaded portion, copy backward sub-segment 3 then generate second crossfaded portion and copy sub-segment 3), then copies sub-segment 4 to the output buffer.

Program Pseudo-code 4 (below) shows an example of steps leading to expanding an audio data stream using the zigzag method in combination with the crossfading method.

Program Pseudo-Code 4

```
crossfade_length = end_crossfade1 — begin_crossfade1;
for (i=0; i<stretched_length; i++)
{
// copy forward from original buffer to stretch buffer
if (i<begin_crossfade1)
     output_buffer[i] = original_buffer[i];
// first crossfade: fade out forward while fading in
  backward
else if((i>=begin_crossfade1) && (i<end_crossfade1))
     fade_in = (i − begin_crossfade1) /
          crossfade_length;
     fade_out = 1.0 − fade_in;
     output [i] =        fade_out * original_buffer[i]
                         + fade_in *
                         original_buffer [
                              end_max_crossfade2 − i];
// second copy: copy backward
else if((i>=end_crossfade1)&&(i<begin_crossfade2))
     output[i] = original_buffer
               [ begin_max_crossfade2
                    − (i − end_crossfade1)];
// second crossfade: fade out backward while fading in
     forward
else if((i>= begin_crossfade2) && (i<end_crossfade2))
fade_in = (i − begin_crossfade2) / crossfade_length;
fade_out = 1.0 − fade_in;
output[i] = fade_out *
original_buffer [end_max_crossfade1
          − (i − begin_crossfade2)]
          + fade_in *
          original_buffer[
               begin_max_crossfade1 + i
                    − begin_crossfade2];
// third copy is forward
else if((i>=end_crossfade2)&&(i<begin_crossfade3))
     output [i] = original_buffer[end_max_crossfade1
          + i − end_crossfade2];
// third crossfade: fade out forward while fading in
     backward
else if((i>=begin_crossfade3) && (i<end_crossfade3))
     fade_in = (i − begin_crossfade3) /
          crossfade_length;
     fade_out = 1.0 − fade_in;
          output[i] = fade_out *
               original_buffer[begin_max_crossfade2 + i
                    − begin_crossfade3]
               + fade_in *
               original_buffer[end_max_crossfade2
                    − (i − begin_crossfade3)];
// fourth copy: copy backward
else if((i>=end_crossfade3)&&(i<begin_crossfade4))
output [i] = original_buffer[begin_max_crossfade2
          − (i − end_crossfade3)];
// fourth crossfade: fade out backward while fading in
     final forward
else if((i>=begin_crossfade4) && (i<end_crossfade4))
     fade_in = (i − begin_crossfade4) /
               crossfade_length;
     fade_out = 1.0 − fade_in;
     output[i] = fade_out *
          original_buffer[end_max_crossfade1 − (i
                    − begin_crossfade4)]
          + fade_in * original_buffer[original_length
               − stretched_length + i];
// final copy
else if((i>=end_crossfade4)&&(i<stretched_length))
     output[i] = original_buffer[original_length
                    − stretched_length + i];
}
```

Zigzag Method

Figure 8:
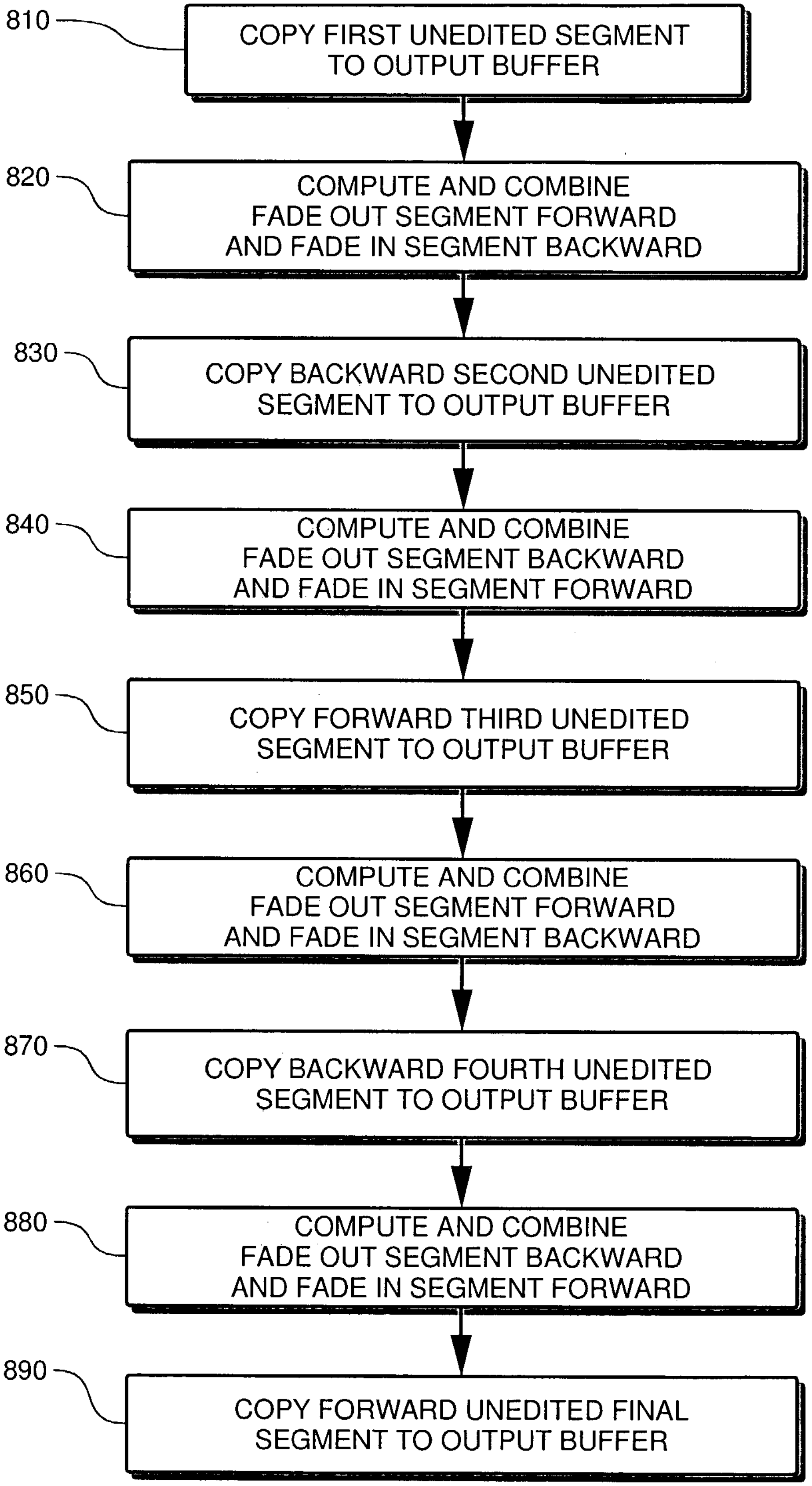
FIG. 8 is a flowchart diagram that illustrates steps involved in expanding an audio data segment using backward/forward method in combination with the crossfading method in embodiments of the invention.

FIG. 8 is a flowchart diagram that illustrates steps involved in expanding an audio data segment using backward/forward method in combination with the crossfading method in embodiments of the invention. At step 810, a system embodying the invention copies the first unedited segment from the original buffer to the output buffer (e.g. 422 and 424 in previous examples of FIGS. 6 and 7). At step 820, the system computes and combines the fade-out and fade-in segments following the basic steps described in the flowchart of FIG. 5. The computations that occur at each repetition involve computing the fading coefficient for each of the fade-out and fade-in segments. The system then computes the product of the fade-out segment with the fade-out coefficient, and the product of the fade-in segment with the fade-in coefficient with the fade-in segment, respectively, and then sums the results of the two computations in a single crossfaded segment. At step 830, the system copies an unedited segment between the first crossfaded segment and a second crossfaded segment. At step 840, the system computes and combines a fade-out segment backward and a fade-in segment forward. At step 840, the system follows the basic steps of computing fading functions. However, the system, while computing the fade-out segment, reverses the sense in which the segment is used (i.e. the last data samples of the segment are used at the beginning of the faded-out segment).

At step 850, the system embodying the invention copies backward a third unedited segment from the original buffer to the output buffer. At step 860, computes and combines a faded-out segment forward and a faded-in segment backward. At step 870, the system copies backward a fourth unedited segment from the original audio stream to the output buffer. At step 880, computes and combines a faded-out segment backward and a faded-in segment forward. At step 890, the system copies an unedited final segment from the original audio stream to the output buffer.

Both the Chained Copy-Crossfade-Copy and the Zigzag Chained Copy-Crossfade-Copy methods can be improved by adjusting the positions of begin_max_crossfade_1, end_max_crossfade1, begin_max_crossfade2 and end_max_crossfade2 (which define the boundaries of the repeated section) for each individual audio segment to minimize audio artifacts. Ideally, the middle section, which is repeated many times, should have a constant "energy", i.e. no part of this region should sound louder than any other part. By dividing a segment into smaller sections and calculating the energy of each of these sections, it is possible to locate the portion of the segment that has a relatively constant energy. The system moves the positions of begin_max_crossfade_1 and end_max_crossfade1 to the beginning of this stable region and moves begin_max_crossfade_2 and end_max_crossfade2 to the end of the region. Various methods calculate an energy value (as described in FIG. 3); one efficient approach is to sum the squares of each sample in a region, another is to sum the absolute values.

Threshold Insertion Method

Embodiments of the invention utilize a threshold detection method to find portions of the audio stream where the energy is low enough to qualify as silence. A noise gate would typically, block portions of low energy out. A noise gate is a simple signal processor used to remove unwanted noise from a recorded audio signal. A noise gate computes the energy of the incoming audio signal and mutes the signal if the energy is below a user-defined threshold. If the signal is louder than the threshold, it is simply passed or copied to the output of the noise gate. Embodiments of the invention use the portions of silence/pause to introduce longer periods of silence into the audio stream. These portions are lengthened by adding inaudible valued samples until the desired new length is achieved. Some audio signals can be time stretched with this method very successfully, particularly signals which have portions that are energetic (loud) and, ideally, portions that are silent. Such is the case for recordings of many percussive musical instruments, such as drums; here, nearly all of the energy of a segment may be concentrated in a very short loud section (the striking of the drum). Signals with no quiet section or of constant energy do not lend themselves to this technique.

A common feature in voicemail systems is a "silence remover", i.e. a mechanism for removing pauses between words in order to conserve memory and to allow the user to listen more quickly to a recorded message. Since background noise is commonly present on recordings, the "silent" pauses to be removed are not completely silent but instead have a finite but low energy compared to the desired speech signal. The system may apply a noise gate to the original signal, but instead of muting quiet portions of the signal, this modified noise gate simply deletes the quiet portions, thus saving memory.

Figure 9:
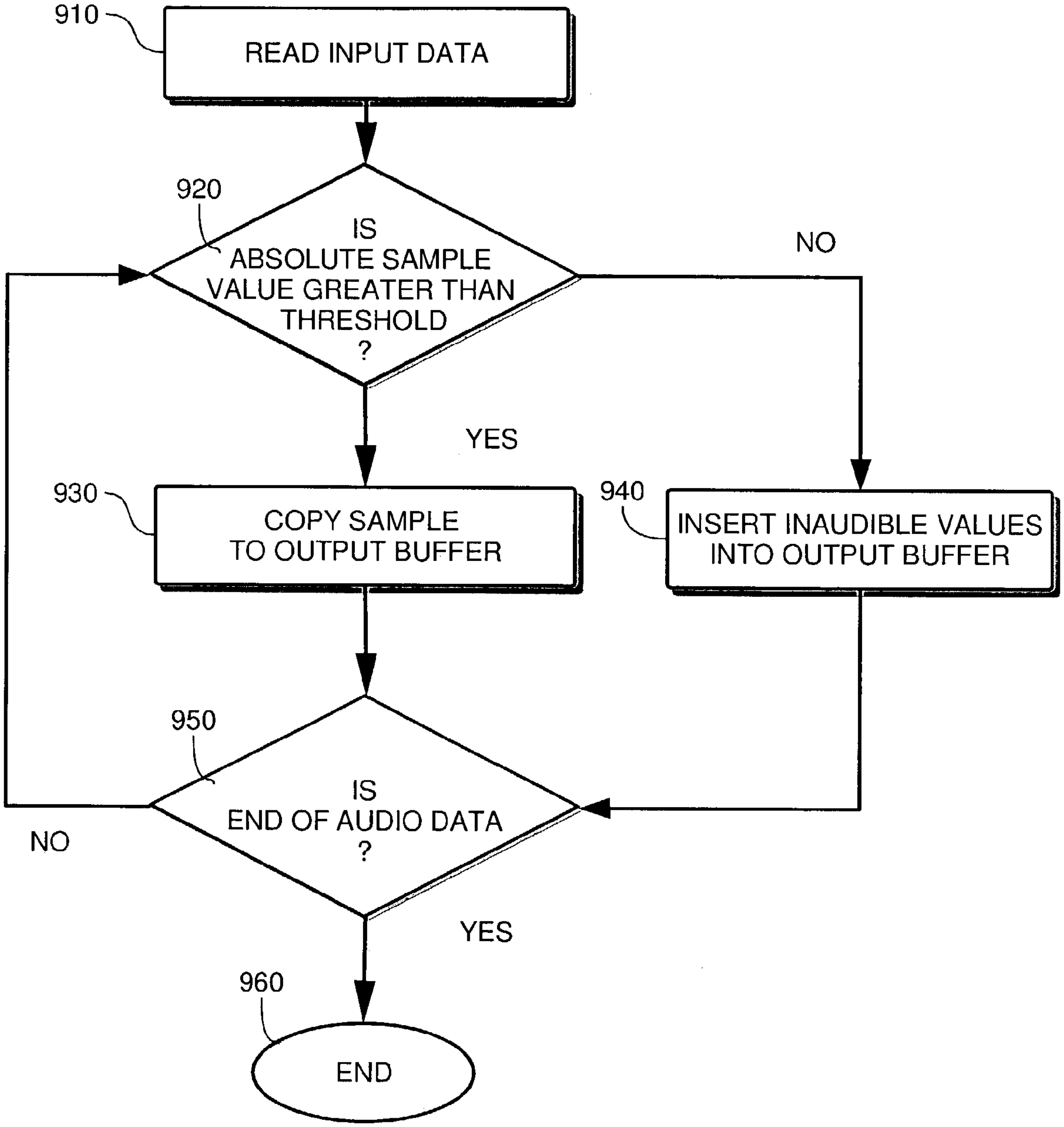
FIG. 9 is a flowchart diagram illustrating steps involved in time stretching audio data using a threshold based insertion method in embodiments of the invention.

FIG. 9 is a flowchart diagram illustrating steps involved in time stretching audio data using a threshold based insertion method in embodiments of the invention. At step 910, a system embodying the invention reads a data sample from the input buffer of audio data. At step 920, the system compares the absolute value (or the result of a mathematical expression thereof) to a threshold value. If the sample's value is greater than or equal to the threshold value, the system writes the data sample to the output buffer at step 930. If the sample value is smaller than the threshold value, the system inserts inaudible values in the output buffer at step 940. The amount of data inserted can be predetermined as a function of the desired stretching ratio and length of the silence period and any other parameter that the user may chose to enter. Examples of parameters for stretching (or not stretching) an audio segment include pauses whose removal would make a speech less intelligible. At step 950, the system test for end of audio data. If the test does not detect the end of the audio data it continues with step 920, otherwise the system stops the process at step 960.

Artificial Reverberation Method

Artificial reverberators (or "reverbs") process an audio signal to make it sound as though the audio signal is being played in an actual room, such as a concert hall. A reverb achieves this acoustic embellishment by adding to the signal a myriad of randomly timed echoes that get quieter over a short time, typically one to five seconds. For example, a single note sung into a reverb will continue ringing or sounding even after the singer has stopped.

Embodiments of the invention utilize one or more reverb methods to expand audio data segments. Reverb provides a way to time stretch an audio signal without the signal sounding "reverberated".

Figure 10:
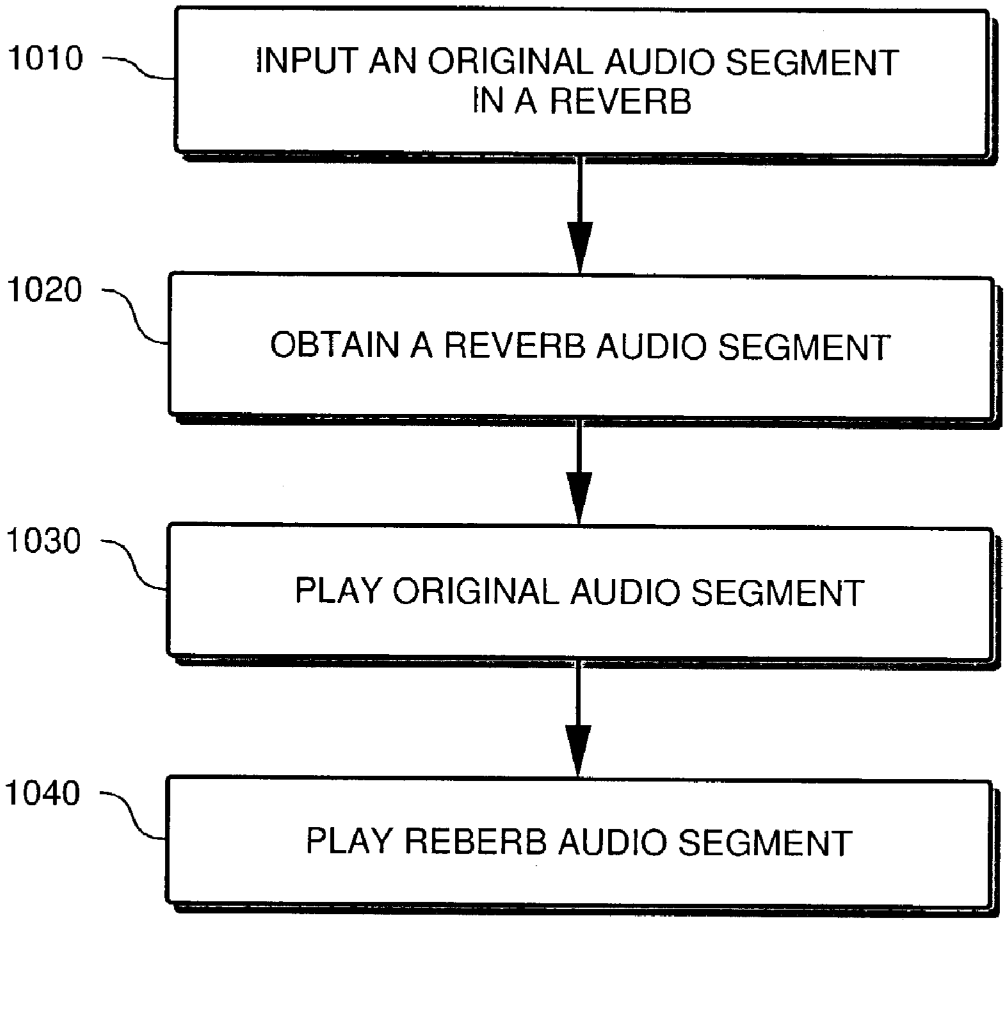
FIG. 10 is a flowchart illustrating steps involved in utilizing a reverb to time stretch an audio segment in accordance with embodiments of the invention.

FIG. 10 is a flowchart illustrating steps involved in utilizing a reverb to time stretch an audio segment in accordance with embodiments of the invention. At step 1010, a system embodying the invention inputs a segment to a reverb while the output of the reverb is not included in the processed signal until the end of the original un-stretched segment is reached. At step 1020, the system obtains a reverb segment. A reverb segment is a segment having the characteristics of one or more echoes of the original segment. A reverb may be a physical device enabled to be interfaced with an embodiment of the invention, or may be a software system (e.g. software component, or application) capable or generating a reverb segment. At step 1030, the system plays the original segment. Playing a segment may be simply feeding the segment to a buffer for storing audio data, or directly feeding the segment to an acoustics system. At step 1040, the system embodying the invention feeds the reverb segment to the output, which results in expanding the original segment without producing an audible artifact of reverberation. These steps are then repeated for the next segment in the audio stream.

The reverberation based time stretch method of the invention works best on continuous-energy signals, and not as well on percussive signals, thus complementing the noise gate time stretch method discussed above.

Thus a method and apparatus for time stretching audio data that utilizes a detection mechanism to segment the audio data and select one of multiple ways of stretching the audio data have been presented. The artificial reverb based method, as well as the crossfade method, can be used in error concealment as well. The goal in this area of technology is to synthesize data that is missing or corrupted. Current techniques include frequency analysis of audio sections that directly precede and follow the missing data, and subsequent synthesis of the missing data. Such approaches are computationally intensive, while simpler approaches such as merely repeating previous good data sound inferior. The reverberation time stretch method can sound as good as frequency analysis methods, with significantly less computation required.

The claimed invention is:

1. A method for time stretching audio data without changing the pitch comprising:

obtaining at least one audio data stream;

obtaining at least one energy property representation of said at least one audio data stream;

obtaining at least one optimal input segment for time stretching using said at least one energy property representation;

defining a first segment and a second segment that at least overlap said optimal input segment; and generating an output segment by sequentially crossfading said first segment and said second segment;

wherein sequentially crossfading comprises a first crossfading of said first segment and said second segment while reversing the sense of said first segment and a second crossfading of said first segment and said second segment while reversing the sense of said second segment.

2. The method of claim 1, wherein said obtaining at least one energy property representation further comprises computing a square of the amplitude of data samples in said audio stream.

3. The method of claim 1, wherein said obtaining said at least one optimal input segment further comprises obtaining a plurality of adjacent segments in said audio stream.

4. The method of claim 1, wherein said defining said first segment and said second segment further comprises defining a plurality of boundaries associated with said first segment and said second segment.

5. The method of claim 1, wherein said defining said plurality of boundaries further comprises defining boundaries for copying unedited audio segments.

6. The method of claim 1, wherein said crossfading said first segment and said second segment further comprises computing a fade-out coefficient and a fade-in coefficient.

7. The method of claim 6, wherein said crossfading said first segment and said second segment further comprises computing a first product of said first segment with said fade-out coefficient and a second product of said second segment and said fade-in coefficient.

8. The method of claim 7, wherein said crossfading said first segment and said second segment further comprises summing said first product and said second product.

9. The method of claim 1, wherein said reversing the sense of said at least one of said first segment and said second segment further comprises running an index from the end of said at least one of said first segment and said second segment.

10. The method of claim 1, wherein said sequentially crossfading further comprises copying at least a portion of unedited data from said data stream to said output segment.

11. A computer-readable medium carrying one or more sequences of instructions executable on a computer for time stretching audio data without changing the pitch, wherein execution of the one or more sequences of instructions by one or more processors causes the one or more processors to perform the steps of:

obtaining at least one audio data stream;

obtaining at least one energy property representation of said at least one audio data stream;

obtaining at least one optimal input segment for time stretching using said at least one energy property representation;

defining a first segment and a second segment that at least overlap said optimal input segment; and generating an output segment by sequentially crossfading said first segment and said second segment;

wherein sequentially crossfading comprises a first crossfading of said first segment and said second segment while reversing the sense of said first segment and a second crossfading of said first segment and said second segment while reversing the sense of said second segment.

12. An apparatus comprising:

a network interface;

a memory; and one or more processors connected to the network interface and the memory, the one or more processors configured for obtaining at least one audio data stream;

obtaining at least one energy property representation of said at least one audio data stream;

obtaining at least one optimal input segment for time stretching using said at least one energy property representation;

defining a first segment and a second segment that at least overlap said optimal input segment; and generating an output segment by sequentially crossfading said first segment and said second segment;

wherein sequentially crossfading comprises a first crossfading of said first segment and said second segment while reversing the sense of said first segment and a second crossfading of said first segment and said second segment while reversing the sense of said second segment.

* * * * *

UNITED STATES PATENT AND TRADEMARK OFFICE

CERTIFICATE OF CORRECTION

PATENT NO. : 7,233,832 B2
APPLICATION NO. : 10/407852
DATED : June 19, 2007
INVENTOR(S) : Sol Friedman et al.

It is certified that error appears in the above-identified patent and that said Letters Patent is hereby corrected as shown below:

COLUMN 13
Line 57, delete “claim 1” and insert --claim 4--.

Signed and Sealed this

Seventh Day of August, 2007

JON W. DUDAS
*Director of the United States Patent and Trademark Office*